3,046,104
METHOD FOR THE CONTROL OF WEEDS
Max Ehlers, Forstweg 64, Berlin-Frohnau, Germany; Gerhard Liedtke, N. 65 Guinestr. 38, Berlin, Germany; and Horst Hilgert, Schnepfenreuther Weg 65, Berlin-Spandau, Germany
No Drawing. Filed Mar. 15, 1960, Ser. No. 15,034
Claims priority, application Germany Apr. 11, 1959
7 Claims. (Cl. 71—2.3)

This invention relates to novel compositions for the destruction of weeds. More particularly, the invention concerns weed killing compositions which contain as their essential active ingredient an alkenyl sulfonarylide.

The use of sulfonamide type compounds as weed killing agents has been disclosed in German Patent 823,970. However, the compounds disclosed in that patent were exclusively saturated compounds, comprising indefinitely characterized sulfochlorination products of hydrocarbon fractions, which had a restricted applicability. It could not have been predicted from the disclosures of this patent that the unsaturated sulfonamides, and particularly the vinyl sulfonanilide compositions of the present invention would exhibit their remarkable and improved mode of action.

In accordance with the present invention, it has been found that alkenyl sulfonarylides, and particularly alkenyl sulfonanilides of the following general formula:

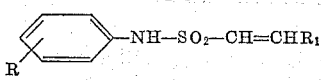

wherein R is a member selected from the group consisting of hydrogen, halogen, alkyl, and nitro, and $R_1$ is a member selected from the group consisting of hydrogen and alkyl, are particularly well suited as agents for the destruction and control of weeds. As halogen substituents there are included chlorine, bromine, iodine and fluorine. The alkyl substituents may include any alkyl group ranging in carbon atom content from about 1 to 5 carbon atoms, and preferably a lower alkyl group such as for example methyl, ethyl, propyl, and butyl.

As examples of compounds which may successfully be employed as weed killing agents in accordance with the invention, there may be mentioned:

Vinylsulfonanilide
Vinylsulfon-p-chloranilide
Vinylsulfon-m-chloranilide
Vinylsulfon-p-toluidide
Vinylsulfon-m-toluidide
Vinylsulfon-m-nitroanilide
Propenylsulfonanilide The excellent herbicidal properties of the aforementioned compounds are particularly evident in their inhibiting action upon germination and development of the plants when used in prophylactic or preventive application. They inhibit the growth of weeds in treated areas when the treatment is applied before the growth can get under way, and particularly after tillage of the soil. The compositions of this invention thus act as preemergence weed killing agents, which have their most positive action against weeds in the earliest stage of development, including the development of germinating seeds and which exhibit a lesser effect against weeds already fully grown. Moreover, the novel weed killing compositions exhibit a high degree of selectivity toward weeds as compared with cultivated plants, upon which they have little effect, such as for example, peas, cabbage, onions, and alfalfa. The new weed killing compositions are superior to hitherto known compounds of similar constitution in their herbicidal action, and their selectivity toward sensitive crops, such as cabbage, clover, and the like is much better than for example, that of the known weed killer isopropyl-N-(3-chlorphenyl)-carbamate (CIPC).

The weed killing compositions of this invention are applied to the upper surface of the soil in a state of uniform subdivision, e.g. by spraying or scattering. In order to obtain improved distribution, they are mixed with a diluent or thinner. As a diluent, there can be employed any conventional inorganic or organic carrier, including a fertilizer mixture, such as for example urea, phosphates or nitrates; natural clays (bentonites), minerals such as kaolin, diatomaceous earth, calcium carbonate and others, or they may be embodied in liquid formulations such as solutions, dispersions or emulsions in water or organic solvents, for instance, alcohols, ketones, hydrocarbons. When applied in aqueous solution the compounds are preferably used in the form of their alkali or amine-salts. When applied as solid formulation this may be a powdered dust or granular. Moreover the liquid or solid formulation may contain the usual adjuvants such as surface active agents, emulsifiers, diluents and so on.

The preparations are preferably applied in such quantities, that about 2 to 20 kg. of the active substance are supplied to the hectare i.e. when about 500 to 100 l./ha. of a liquid spray are employed that the concentration of the active substance is about 0.2 to 2%. It is also possible to take advantage of the solubility of the alkenyl sulfonanilides in aqueous solutions of alkalies or amines and to employ these solutions as solvents.

The following examples serve to illustrate the novel compositions of this invention but are not to be regarded as limiting.

EXAMPLE 1

Herbicidal sprays containing respectively 0.5% by weight of each of the compounds listed in Table I in aqueous dispersion are brought up to the soil in such quantities that 5 kg. of the active ingredient are applied to the hectare.

Table I

| | Concentration of Active Ingredient in the Spray Composition, Percent | Mustard | Tomatoes | Meadow Grass |
|---|---|---|---|---|
| Vinylsulfonanilide | 0.5 | 3(1) | 3(0) | 0(0) |
| Vinylsulfon-p-chloranilide | 0.5 | 31(13) | 5(1) | 40(10) |
| Vinylsulfon-m-chloranilide | 0.5 | 23(6) | 0(0) | 0(0) |
| Vinylsulfon-p-toluidide | 0.5 | 28(13) | 39(7) | 17(3) |
| Vinylsulfon-m-toluidide | 0.5 | 36(13) | 22(2) | 0(0) |
| Vinylsulfon-m-nitroanilide | 0.5 | 6(1) | 31(13) | 81(35) |
| Untreated | | 100(100) | 100(100) | 100(100) |

The aqueous dispersions were sprayed upon the upper surface of the soil which had been previously seeded with the seeds of several test plants (mustard tomatoes, and meadow grass) in individual dishes. Table I shows the results in terms of percentage growth in relation to a dish of untreated soil. The first set of numerals indicates the percentage of growing test plants, while the numerals in parenthesis indicate their weight in relation to the untreated controls.

EXAMPLE 2

The seeds of several broad leaved weeds, for example, little flower quickweed (*Galinsoga parviflora*) annual nettle, (*Urtica urens*), lamb's-quarters (*Chenopodium album*) and of grasses were introduced into the soil in several dishes. The respective dishes were sprayed on the upper surface of the soil with a preparation containing vinylsulfonanilide in aqueous dispersion so that the concentration of active ingredients in the soil was 0.5 g. per sq. meter. The results are shown in the following Table II, which indicates the comparative growth of weeds in relation to that in untreated soil.

Table 2

|  | Grams Active Ingredient Per Sq. Meter | Broad Leaved Weeds | Grasses |
|---|---|---|---|
| Vinylsulfonanilide | 0.5 | 30 | 25 |
| Untreated |  | 100 | 100 |

EXAMPLE 3

In a field test, in which the upper surface of the previously tilled soil was sprayed with the weed killer, the relative weed growth compared with untreated soil was measured for various concentrations of active ingredients per square meter of soil as shown in Table 3.

Table 3

|  | Grams Active Ingredient Per. Sq. M. | Relative Weed Growth |
|---|---|---|
| Vinylsulfonanilide | 0.5 | 45 |
|  | 0.75 | 30 |
|  | 1.0 | 17.5 |
| Vinylsulfon-p-chloranilide | 0.5 | 55 |
|  | 1.0 | 20 |
| Vinylsulfon-m-chloranilide | 0.5 | 30 |
|  | 1.0 | 17.5 |
| Untreated |  | 100 |

EXAMPLE 4

In another field test in which previously tilled soil was sprayed after seeding with various crops, untreated parcels of land were used as controls. Table 4 shows the relative values between treated and untreated parcels for the growth of weeds and of the cultivated plants.

Table 4

|  | Grams Active Ingredient Per Sq. M. | Peas | Cabbage | Alfalfa | Clover | Onions | Weeds |
|---|---|---|---|---|---|---|---|
| Vinylsulfonanilide | 0.4 | 100 | 100 | 100 | 80 | 100 | 50 |
|  | 1.0 | 100 | 90 | 80 | 70 | 90 | 10 |
| Isoproply-N-(3-chlorphenyl)-carbamate (CIPC) | 0.5 | 50 | 10 | 20 | 10 | 90 | 30 |
| Untreated |  | 100 | 100 | 100 | 100 | 100 | 100 |

EXAMPLE 5

A test carried out with propenylsulfonanilide under the same conditions as in Example 1 gave the results shown in Table 5.

Table 5

|  | Mustard | Tomatoes | Meadow Grass |
|---|---|---|---|
| Concentration of Ingredient in Spray 0.5% | 68(40) | 2(1) | 0(0) |
| Untreated | 100(100) | 100(100) | 100(100) |

EXAMPLE 6

In a field test the soil was treated 3 days after seeding of kohlrabi by spraying. Table 6 shows relative values for the action upon the weed and the cultivated plants related to untreated parcels (=100).

Table 6

|  | g. active Ingredient per Sq. M. | Weed | Kohlrabi |
|---|---|---|---|
| Vinylsulfonanilide | 0.25 | 50 | 100 |
|  | 0.5 | 10 | 100 |
| Untreated |  | 100 | 100 |

EXAMPLE 7

In a field test the soil was sprayed 2 days after the cultivated plants (carrots, onions, peas) had been seeded. Table 7 shows relative values for the effect upon the weeds and the cultivated plants related to untreated parcels (=100). There are also given comparative data for the known herbicide isopropyl-N-(3-chlorophenyl)-carbamate (CIPC) which shows the superior effect of vinylsulfonanilide as a herbicide as well as its better selectivity.

Table 7

|  | g. active substance per Sq. M. | Weed | Cultivated plants | | |
|---|---|---|---|---|---|
|  |  |  | carrots | onions | peas |
| Vinylsulfonanilide | 0.1 | 73 | 166 | 192 | 124 |
|  | 0.5 | 6 | 159 | 305 | 112 |
| CIPC | 0.1 | 86 | 109 | 126 | 99 |
|  | 0.5 | 4 | 111 | 190 | 52 |
| Untreated |  | 100 | 100 | 100 | 100 |

The compounds of this application may be prepared by reacting aliphatic disulfochlorides with the corresponding aromatic amines (B34, 3474 (1901), B36, 3628 (1903)) or by reaction of vinylsulfochloride with the corresponding amine.

We claim:

1. A method for the control of weeds which comprises applying to soil infested with weeds prior to the emergence of said weeds a herbicidal amount of an alkenyl sulfonamide having the general formula

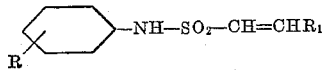

wherein R is a member selected from the group consisting of hydrogen, halogen, alkyl and nitro, and $R_1$ is a member selected from the group consisting of hydrogen and alkyl.

2. The method according to claim 1, wherein an inert carrier is admixed to said alkenyl sulfonamide.

3. The method according ot claim 1, in which the sulfonamide is vinylsulfonanilide.

4. The method according to claim 1, in which the sulfonamide is vinylsulfon-p-chloranilide.

5. The method according to claim 1, in which the sulfonamide is vinylsulfon-m-chloranilide.

6. The method according to claim 1, in which the sulfonamide is propenylsulfonanilide.

7. The method of claim 1, in which R and $R_1$ are lower alkyl groups.

References Cited in the file of this patent

FOREIGN PATENTS 823,970    Germany _____ Dec. 6, 1951

OTHER REFERENCES

Autenreith et al., in "Berichte," vol. 34, 1901, pages 3467 to 3482; vol. 36, 1903, pages 3626 to 3634.

Fromm et al., in "Chemical Abstracts," vol. 46, 1952, col. 8315(g).